US007631998B2

(12) United States Patent
Koike et al.

(10) Patent No.: US 7,631,998 B2
(45) Date of Patent: Dec. 15, 2009

(54) VEHICLE LIGHT

(75) Inventors: Teruo Koike, Tokyo (JP); Shinya Omori, Tokyo (JP); Mitsuo Yamada, Tokyo (JP); Tatsuya Umeyama, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 11/671,173

(22) Filed: Feb. 5, 2007

(65) Prior Publication Data

US 2007/0183167 A1 Aug. 9, 2007

(30) Foreign Application Priority Data

Feb. 3, 2006 (JP) ............................ 2006-026575

(51) Int. Cl.
*B60Q 3/00* (2006.01)

(52) U.S. Cl. ....................... 362/538; 362/267; 362/516; 362/545

(58) Field of Classification Search ................. 362/263, 362/264, 267, 509, 514, 516, 538, 545, 546
See application file for complete search history.

(56) References Cited

U.S. PATENT DOCUMENTS

2006/0007677 A1* 1/2006 Israel et al. ................. 362/227
2006/0285341 A1* 12/2006 Yatsuda et al. .............. 362/464

FOREIGN PATENT DOCUMENTS

JP 2005276805 10/2005

* cited by examiner

*Primary Examiner*—Sandra L O'Shea
*Assistant Examiner*—Meghan K Dunwiddie
(74) *Attorney, Agent, or Firm*—Cermak Kenealy Vaidya & Nakajima LLP

(57) ABSTRACT

A vehicle light that includes a semiconductor light emitting device can have a simple structure which suppresses deterioration of the light emitting quality of the device. The vehicle light can be configured to prevent aging and/or deterioration of components, such as a vapor deposited silver coating on the reflection surface of a reflector of the light. The vehicle light can also include a projector type optical unit that has the following components: a semiconductor light emitting device; a reflector which surrounds the semiconductor light emitting device from a rear side such that light emitted from the semiconductor light emitting device is reflected in a forward direction; and a projection lens which projects light being directly from the light emitting device or after reflected by the reflector in the forward direction. Furthermore, a space around the semiconductor light emitting device of the optical unit can be hermetically sealed from the outside atmosphere. A sealing member can be used to form the sealed space.

19 Claims, 4 Drawing Sheets

VEHICLE LIGHT

This application claims the priority benefit under 35 U.S.C. § 119 of Japanese Patent Application No. 2006-026575 filed on Feb. 3, 2006, which is hereby incorporated in its entirety by reference.

BACKGROUND

1. Field

The disclosed subject matter relates to a vehicle light which employs a semiconductor light emitting device as a light source.

2. Description of the Related Art

In recent years, the output power of a semiconductor light emitting device such as an LED has increased, and the luminance thereof has increased accordingly. With the increase in the luminance, the development of an LED and the like used as a light source for a vehicle light is continuously in progress.

Japanese Patent Application Laid-Open No. 2005-276805 discloses a vehicle light which employs a semiconductor light emitting device such as an LED, for example, as a light source. An example of the configuration of such a vehicle light is shown in FIG. 1.

In FIG. 1, a vehicle light 1 of the conventional example is constituted as a headlight for an automobile and is configured to include at least one optical unit 2.

The optical unit 2 may include: a light source 3; a first reflector 4; a second reflector 5; a third reflector 6; a projection lens 7; and a shutter 8.

The light source 3 is composed of at least one LED 3*a* mounted on a substrate (not shown). Here, the LED 3*a* is disposed so as to emit light in an upward direction. In this configuration, a driving voltage is applied to the LED 3*a* from an exterior power source to drive it and realize an emission of light.

It should be noted that examples of the semiconductor light emitting device employed in the light source 3 may include, in addition to an LED, a semiconductor laser device, etc.

The first reflector 4 is formed from an elliptic reflection surface having a fist focus F1 located in the vicinity of the light source 3 and a second focus F2 located in the vicinity of a rear side focus of the projection lens 7.

The second reflector 5 is formed from an elliptic reflection surface having a fist focus located in the vicinity of the light source 3 and a second focus F3 located on a line connecting the light source 3 and the rear side focus of the projection lens 7.

The third reflector 6 is formed from an elliptic reflection surface having a fist focus located in the vicinity of the second focus of the second reflector 5 and a second focus located in the vicinity of the rear side focus of the projection lens 7. Alternatively, the third reflector 6 can be formed from a parabolic reflection surface having a focus in the vicinity of the second focus of the second reflector 5 and having an optical axis extending horizontally forward.

The projection lens 7 is composed of a convex lens. The light that has been reflected by the first reflector 4 or the third reflector 6 and then which converges in the vicinity of the rear side focus of the projection lens 7 is projected forward through the projection lens 7 to be substantially parallel light.

The shutter 8 is placed in the vicinity of the rear side focus of the projection lens 7, and an upper edge 8*a* of the shutter 8 forms a cut-off for shaping, for example, a passing light distribution beam.

In the vehicle light 1 having such a configuration, when power is supplied to the LED 3*a* of the light source 3 of the optical unit 2, the LED 3*a* is driven to emit light. Then, part of the light emitted from the LED 3*a* is incident on the projection lens 7 either directly or indirectly after being reflected by the first reflector 4. That total light is then projected forward.

Furthermore, the light incident on the second reflector 5 is reflected thereby and is directed toward the third reflector 6. Then, the light is reflected by the third reflector 6, and the reflected light is incident on the projection lens 7. As a result, the light is projected forward through the projection lens 7.

At this time, the light converging toward the rear side focus of the projection lens 7 is partially blocked by the shutter 8, and a cut-off is formed by the upper edge 8*a* thereof. The light having the thus-shaped light distribution pattern (for example, a passing beam light distribution) is projected forward.

Generally, an LED for use in such a vehicle light 1 is often encapsulated with a resin such as a silicon resin. Since such a silicon resin has a certain degree of hygroscopicity, the silicon resin may deteriorate due to absorption of moisture during long-term use. In this case, the optical characteristics of the LED as a whole may be changed. That is, the light emitting quality may deteriorate.

For example, in reliability experiments for an LED formed of GaAlAs as a base material, the luminous intensity of emitted light was 106.6% of the original intensity after the LED was energized for 1,000 hours at room temperature (25° C.), 106.3% after the LED was energized for 1,000 hours at high temperature (85° C.), and 96.6% after the LED was energized for 1,000 hours at low temperature (−40° C.). However, after the LED was energized for 1,000 hours at high temperature (80° C.) and high humidity (85%), the luminous intensity of emitted light was 84.7%. Thus, it was found that deterioration due to humidity was significant.

Furthermore, in the case of an LED formed of phosphor-containing GaN as a base material, the luminous intensity of emitted light was 89.6% after the LED was energized for 1,000 hours at high temperature (60° C.) and high humidity (90%). Similarly, it was found that the deterioration due to humidity was significant.

Such a problem may occur not only when a light source is a resin-encapsulated LED but also when a light source is selected from one of other types of semiconductor light emitting devices such as semiconductor laser devices, etc.

Examples of the reflectors 4, 5, and 6 include reflectors having a reflection surface coated with, for example, vapor deposited silver. When such reflectors are employed, the surface thereof may oxidize or sulphidize during long-term use. In particular, when the surface is sulphidized, the appearance color may change which can result in a reduction in reflectivity.

SUMMARY

Therefore, in view of the above-described and other issues and characteristics, according to an aspect of the disclosed subject matter, a vehicle light can be configured to have a simple structure which can suppress the deterioration of the light emitting quality of a semiconductor light emitting device and can prevent the aged deterioration of a coating on the reflection surface of a reflector.

According to another aspect of the disclosed subject matter, a vehicle light can include a projector type optical unit having: a semiconductor light emitting device; a reflector which is configured to surround the semiconductor light emitting device from a rear side such that light emitted from the semiconductor light emitting device is reflected in a forward direction; and a projection lens which can project light reflected by the reflector and direct light from the semiconductor light emitting device in the forward direction. When energizing the semiconductor light emitting device of the optical unit, the semiconductor light emitting device is driven to emit light. The light emitted from the semiconductor light emitting device can be incident on the projection lens directly or after being reflected by the reflector and gathered in the vicinity of the focus of the projection lens, and then projected forward through the projection lens.

In this instance, a space which surrounds the semiconductor light emitting device and includes an inner surface of the reflector of the optical unit can be hermetically sealed. Therefore, the semiconductor light emitting device can be separated from the outside atmosphere. The deterioration of the material which constitutes the semiconductor light emitting device due to absorption of moisture can be prevented, and thus the reduction in the reliability of the semiconductor light emitting device can be significantly suppressed. In this manner, the life of the semiconductor light emitting device and the vehicle light can be prolonged.

It should be appreciated that the vehicle light can include a sealing member which hermetically seals the sealed space.

An inert gas may be filled in the sealed space defined by the sealing member. In this case, the sealed space does not substantially contain moisture vapor, and the intrusion of moisture vapor into the sealed space from the outside is substantially prevented. Therefore, the reduction in the reliability of the semiconductor light emitting device due to absorption of moisture can be significantly suppressed or eliminated. Hence, the life of the semiconductor light emitting device and the vehicle light can be further prolonged.

The reflector of the optical unit may be coated with vapor deposited silver. In this case, since the inner surface of the reflector is separated from the outside atmosphere by the sealed structure, oxidation and sulphidization (from moisture vapor, exhaust gas from an automobile, or the like) of the surface of the vapor deposited silver coating, can be suppressed and/or prevented. Thus, the change of appearance in color and the reduction in reflectivity caused by humidity and exhaust gas can be effectively suppressed and/or prevented.

The vehicle light can include an air pressure adjusting bag which is made of a film-like material and is connected to the sealed space in order to adjust air pressure in the sealed space sealed by the sealing member. In this case, even when the gas inside the sealed space is expanded by heat generated when the semiconductor light emitting device is driven, the increase in the internal pressure can be effectively absorbed with the air pressure adjusting bag being contracted. Therefore, the deformation and/or fracture of each of the components due to increased internal pressure can be prevented, and clouding of the inner surface of the reflector due to air pressure change can be prevented.

The sealing member may be constituted as a lens holder which supports the projection lens of the optical unit. In this case, the projection lens of the optical unit is hermetically attached through the sealing member to the reflector so as to enclose the semiconductor light emitting device. Accordingly, a minimum space for the optical unit is sealed by the sealing member. At the same time, the respective inner surfaces of the reflector and the projection lens are enclosed in the sealed space. Therefore, clouding of the inner surfaces of the reflector and the projection lens due to moisture vapor and air pressure change can be prevented.

Each of the reflector, the projection lens, and the sealing member of the optical unit may be made of a thermoplastic resin. Furthermore, the sealing member may be hermetically connected to the reflector and the projection lens by welding or bonding.

Alternatively, each of the reflector, the projection lens, and the sealing member of the optical unit may be made of a thermoplastic resin, and the projection lens and the sealing member may be hermetically and integrally molded. In addition, the sealing member may be hermetically connected to the reflector by welding or bonding.

In a further alternative example, each of the reflector, the projection lens, and the sealing member of the optical unit may be made of a thermoplastic resin, and the projection lens may be insert molded hermetically in the sealing member. In addition, the sealing member may be hermetically connected to the reflector by welding or bonding.

In these cases, the components are integrated with each other, whereby the assembly accuracy of the components is improved. Furthermore, the internal space can be easily sealed using a small number of components, whereby the component cost and the assembly cost can be reduced.

The sealing member may be composed of: a housing which has an open front and surrounds the optical unit: and a front-side lens which is made of a transparent material and hermetically seals the open front of the housing. In this case, the entire optical unit is hermetically covered by the housing and the front-side lens.

The housing may be provided with a pinch sealing portion. In this case, after assembly, the housing can be evacuated through the pinch sealing portion, and an inert gas can be introduced into the housing. Subsequently, the pinch sealing portion can be closed. In this manner, the sealed space inside the housing can be easily sealed with the inert gas filled therein.

The housing may be configured such that a convective flow in a space inside the housing due to heat generated by the optical unit is guided toward the front-side lens. In this case, the rear portion of the housing can be narrowed and an upper rear corner of the housing rounded. In this case, the heat generated by the energized semiconductor light emitting device of the optical unit is dissipated from the optical unit to the space inside the housing and is transferred to the front-side lens through a convective flow along the shape of the housing, whereby the front-side lent is heated.

Therefore, the temperature distribution of the space inside the housing can be made uniform. When a plurality of optical units are provided, the temperature conditions of the optical units become approximately the same. Hence, the luminous intensities of the optical units are uniform, and thus the variation of the luminous intensity between the optical units can be suppressed.

As has been described, in a vehicle light comprising at least one optical unit having a semiconductor light emitting device, and which is made in accordance with principles of the presently disclosed subject matter, the space around the semiconductor light emitting device can be sealed from the outside atmosphere by a sealing member. In addition, an inert gas can be introduced into the sealed space. Therefore, the reduction in the reliability of the semiconductor light emitting device due to the hygroscopicity of the material constituting the device can be significantly suppressed. Thus, the life of the semiconductor light emitting device and the vehicle light can be prolonged.

BRIEF DESCRIPTION OF THE DRAWINGS

These and other characteristics, features, and advantages of the disclosed subject matter will become clear from the following description with reference to the accompanying drawings, wherein.

DETAILED DESCRIPTION OF EXEMPLARY EMBODIMENTS

Hereinafter, exemplary embodiments of the disclosed subject matter will be described in detail with reference to FIGS. 2 to 4. The exemplary embodiments described hereinafter are specific examples in accordance with principles of the disclosed subject matter, and thus various technical features are associated therewith. However, the scope of the disclosed subject matter is not limited to the exemplary embodiments.

Figure 1:
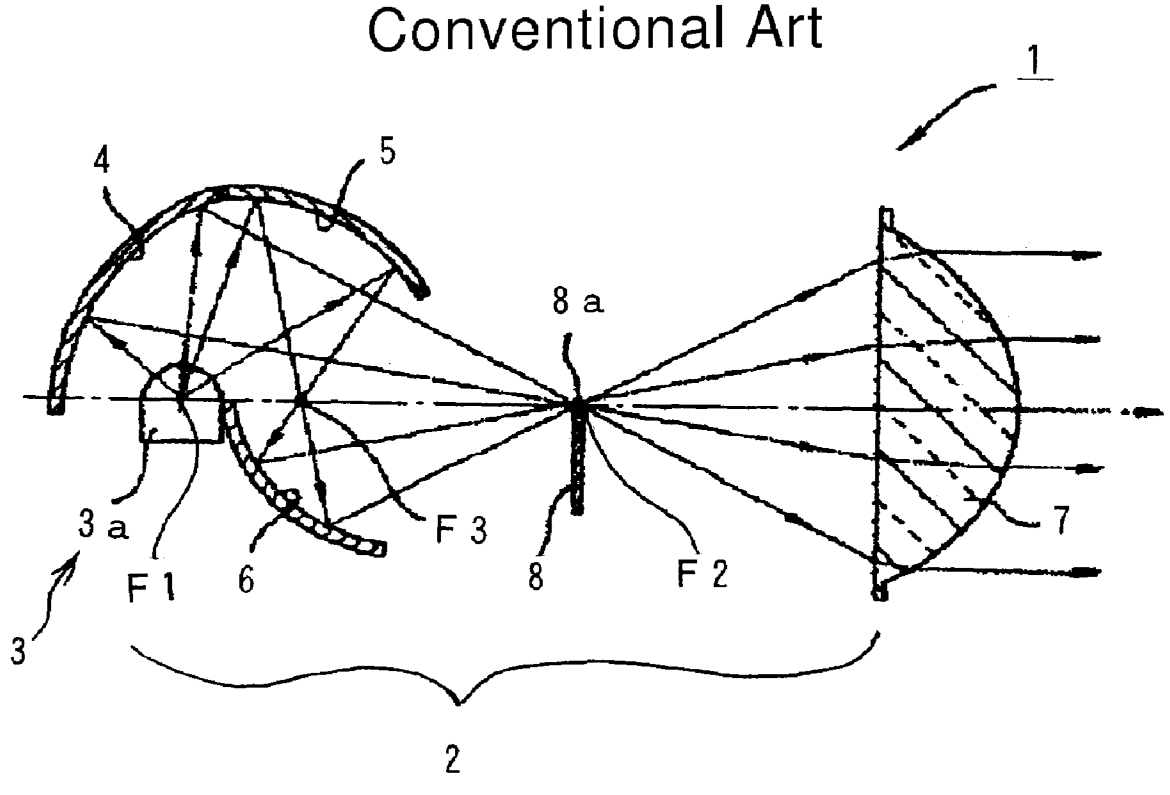
Fig. 1 Conventional Art
FIG. 1 is a schematic cross-sectional view illustrating the configuration of a conventional vehicle light.
Figure 2:
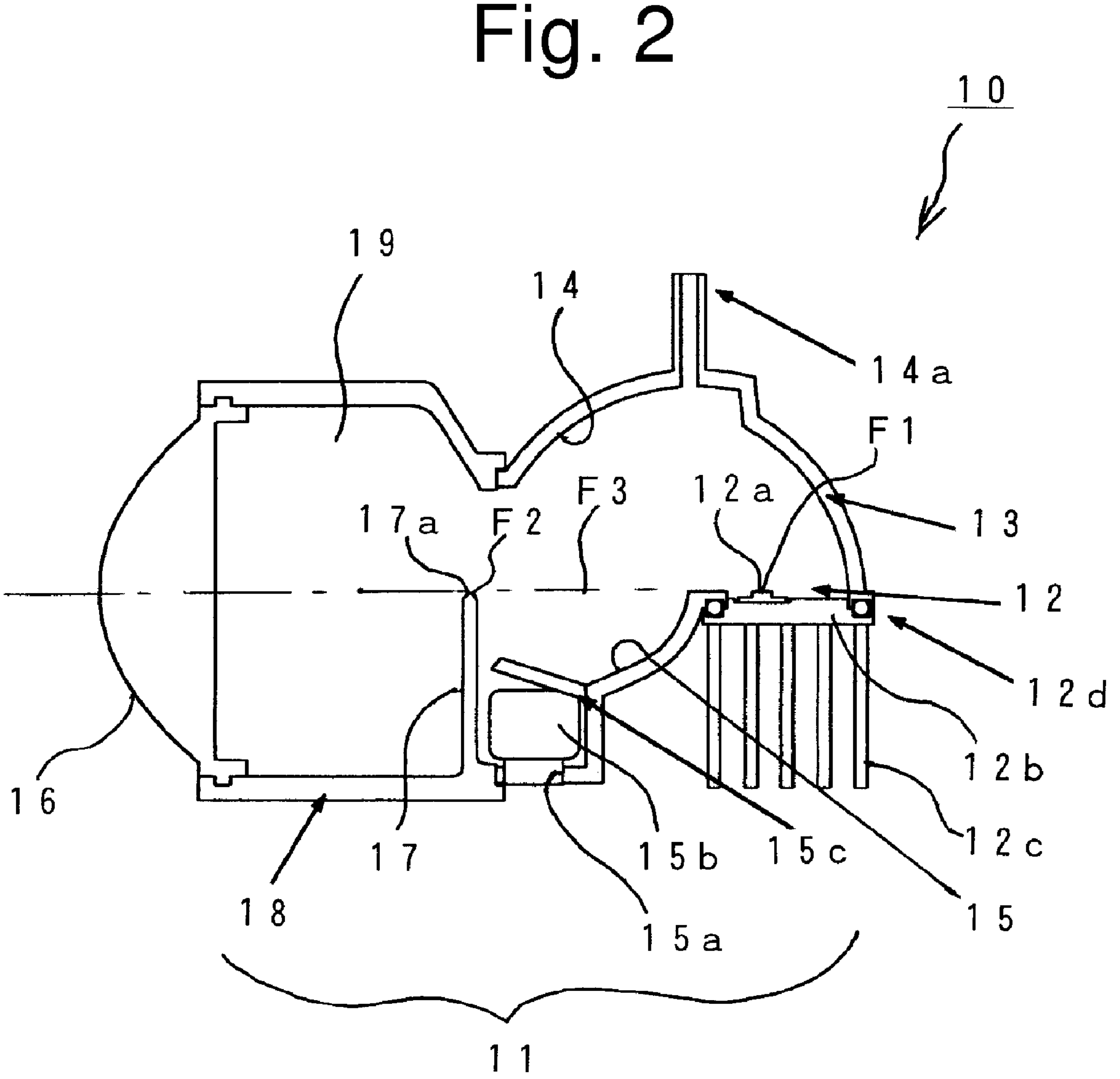
FIG. 2 is a schematic cross-sectional view illustrating an exemplary embodiment of a vehicle light made in accordance with principles of the disclosed subject matter.

FIG. 2 shows the configuration of an exemplary embodiment of a vehicle light made in accordance with principles of the disclosed subject matter.

In FIG. 2, a vehicle light 10 may be an LED headlight for an automobile and be configured to include at least one (one in the illustrated example) projector type optical unit 11.

The optical unit 11 is configured to include: an LED light source 12; a first reflector 13; a second reflector 14; a third reflector 15; a projection lens 16; a shutter 17; and a lens holder 18. The optical unit 11 can have a configuration similar to or the same as a sealed beam structure.

The LED light source 12 can be composed of at least one LED 12*a* (one in the illustrated example). The LED 12*a* can be mounted on a substrate 12*b* which is placed parallel, or horizontal, to the optical axis of the vehicle light and can be configured to emit light upward.

A heat sink 12*c* formed of a material having high thermal conductivity may be attached to the lower surface of the substrate 12*b*. In this case, heat generated by the energized LED 12*a* can be dissipated to the outside.

The first reflector 13 can be formed from an elliptic reflection surface having a first focus F1 located in the vicinity of the LED light source 12 and a second focus F2 located in the vicinity of a rear side focus of the projection lens 16.

The second reflector 14 can be formed from an elliptic reflection surface having a first focus located in the vicinity of the LED light source 12 and a second focus F3 located on a line connecting the LED light source 12 and the rear side focus of the projection lens 16.

The third reflector 15 can be formed from an elliptic reflection surface having a first focus located in the vicinity of the second focus of the second reflector 14 and a second focus located in the vicinity of the rear side focus of the projection lens 16. Alternatively, the third reflector 15 can be formed from a parabolic reflection surface having a focus located in the vicinity of the second focus of the second reflector 14 and having an optical axis extending horizontally forward.

The first, second, and third reflectors 13, 14, and 15 may be molded from a thermoplastic resin. In this exemplary embodiment, they can be integrally molded with each other. Furthermore, the internal surface of each of the reflectors may be coated with vapor deposited silver. The substrate 12*b* of the LED light source 12 can be hermetically fitted to the lower portion of the first reflector 13 through an O-ring 12*d* so as to be adjacent to the first reflector 13.

The projection lens 16 may be composed of a convex lens. The light emitted from the LED light source 12 is reflected by the first reflector 13 and/or the second reflector 14 and converges near the rear side focus of the projection lens 16. The light is then projected forward through the projection lens 16.

The shutter 17 may be placed in the vicinity of the rear side focus of the projection lens 16, and can have an upper edge 17*a* configured to form a cut-off for shaping a passing beam (e.g., low beam light distribution) or other light distribution (e.g., high beam light distribution, fog lamp light distribution, etc.).

The lens holder 18 can support the projection lens 16 and can be constituted as a sealing member in the illustrated example. It should be appreciated that the lens holder 18 may be formed of a thermoplastic resin and may be molded integrally with the shutter 17.

The projection lens 16 can be insert molded in the lens holder 18. Furthermore, the reflectors 13, 14, and 15 can be hermetically fitted to the lens holder 18 and connected by, for example, welding or bonding. The resultant connection structure would be a weld structure or bonded structure, respectively.

An internal space 19 can be hermetically sealed from the outside atmosphere by the reflectors 13, 14, and 15, the projection lens 16, and the lens holder 18 which can be configured as described above.

A pinch sealing portion 14*a* may be provided in an upper part of the second reflector 14 and used for evacuating the internal space 19 and/or for introducing an inert gas into the space 19.

An open hole 15*a* may be provided in the vicinity of the lower end of the third reflector 15. An expandable air pressure adjusting bag 15*b* can be hermetically attached to the open hole 15*a* and provided in the internal space 19.

The air pressure change inside the internal space 19 due to thermal expansion when turning the light source 12 on or off is, for example, about 0.2 atm. The air pressure adjusting bag 15*b* is made of a flexible, thin film-like material, such as high density polyethylene or polypropylene, and may be formed into a bag-like shape, so as to be capable of absorbing the pressure change. Furthermore, in order to regulate the expansion of the air pressure adjusting bag 15*b* toward the inside of the internal space 19, a regulation plate 15*c* may be provided in a position slightly inward from the open hole 15*a*. In this manner, the light reflected from the third reflector 15 is prevented from being blocked when the air pressure adjusting bag 15*b* is accidentally or otherwise expanded inwardly.

The vehicle light 10 of this exemplary embodiment can be constituted as described above, and an inert gas can be introduced into the hermetically sealed internal space 19. The evacuation of the internal space 19 and the introduction of an inert gas into the internal space 19 are carried out as follows, for example.

First, a thin tube (for example, a flexible tube) having a diameter smaller than an opening diameter of the pinch sealing portion 14*a* can be inserted from the pinch sealing portion 14*a* to an appropriate position such as the deepest portion of the internal space 19. Subsequently, while an inert gas (for example, nitrogen gas) that is to be filled is introduced, the tube is pulled out slowly. When the end of the tube passes through the pinch sealing portion 14*a*, the pinch sealing portion 14*a* is sealed. In this manner, the air inside the internal space 19 can be replaced with the inert gas.

If a cleaning gas is first used before an inert gas is introduced, the cleaning gas may be introduced by the same procedure.

In this manner, the inert gas is introduced into the internal space 19 to fill the space 19, and the assembly of the vehicle light 10 is completed.

The thus-assembled vehicle light 10 can operate as follows.

The LED 12*a* of the LED light source 12 of the optical unit 11 can be energized from an exterior power source, whereby the LED 12*a* is driven to emit light.

Then, part of the light emitted from the LED light source 12 is incident on the projection lens 16 directly and/or indirectly (e.g., after being reflected by the first reflector 13) and is projected forward through the projection lens 16.

Furthermore, the light incident on the second reflector 14 is reflected thereby and is directed toward the third reflector 15. Then, the light is reflected by the third reflector 15. The reflected light converges in the vicinity of the focus of the projection lens 16 to be incident on the projection lens 16 and projected forward through the projection lens 16.

At this time, the light having been reflected by the first reflector 13 and the third reflector 15 and which converges toward the rear side focus of the projection lens 16 is partially blocked by the shutter 17, and a cut-off is formed by the upper edge 17*a*. In this manner, light having a light distribution pattern for a passing beam is shaped to be projected forward.

In this exemplary embodiment, the internal space 19 of the optical unit 11 can be hermetically sealed from the outside atmosphere and filled with an inert gas. Therefore, the internal space 19 does not substantially contain moisture vapor, and the intrusion of moisture vapor into the internal space 19 from the outside is substantially prevented.

Therefore, the material constituting the LED 12*a* of the LED light source 12 does not absorb a substantial amount of moisture vapor, and thus deterioration of the material can be prevented. In other words, the reduction in the luminous intensity of the LED 12*a* due to absorption of moisture is prevented and may not occur. Therefore, the reliability of the LED light source 12 is improved, and the life can be prolonged.

Furthermore, since an inert gas is introduced into the internal space 19, the reflection surface of each of the reflectors 13, 14, and 15 is prevented from being clouded by moisture vapor or the like during long-term use. In addition to this, the vapor deposited silver coating on the inner surface of each of the reflectors 13, 14, and 15 can be prevented from being clouded due to oxidation or sulphidization. Therefore, since aging and deterioration can be suppressed and minimized by the introduction of an inert gas into the internal space 19, a bright light distribution pattern can be obtained over a long period of time.

The projection lens 16 and the reflectors 13, 14, and 15 can be integrated into the lens holder 18. Therefore, the number of components can be smaller, and thus the component cost and the assembly cost can be reduced. In addition, since the assembly accuracy between the projection lens 16, the reflectors 13, 14, and 15, and the LED light source 12 is improved, a light distribution pattern having higher accuracy can be obtained.

Furthermore, even when heat is generated in the LED 12*a* of the LED light source 12 of the optical unit 11 to increase or decrease the internal pressure of the sealed internal space 19, the air pressure adjusting bag 15*b* can expand or contract to maintain the internal pressure of the internal space 19 approximately constant. Therefore, the deformation or fracture of the reflectors 13, 14, and 15 and the projection lens 16 due to thermal expansion can be prevented.

Furthermore, the heat generated in the LED 12*a* can be transmitted to the heat sink 12*c* and then dissipated from the heat sink 12*c* to the outside.

Figure 3:
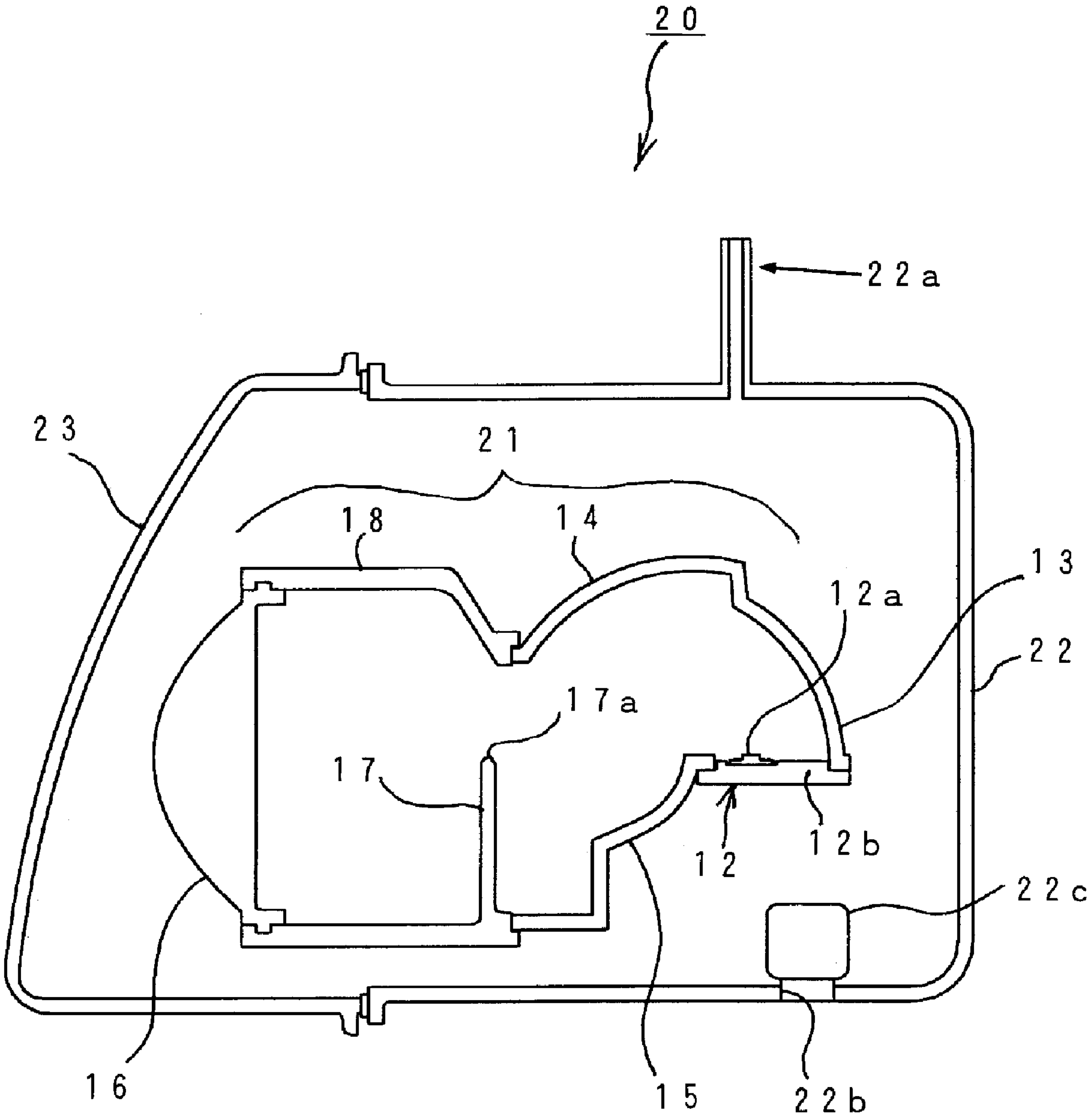
FIG. 3 is a schematic cross-sectional view illustrating another exemplary embodiment of a vehicle light made in accordance with principles of the disclosed subject matter.

FIG. 3 shows the configuration of another exemplary embodiment of a vehicle light made in accordance with principles of the disclosed subject matter.

In FIG. 3, a vehicle light 20 may be an LED headlight for an automobile. The vehicle light 20 is configured to include: at least one (one in the illustrated example) optical unit 21; a housing 22 which surrounds the optical unit 21 and has an open front; and a transparent front-side lens 23 which is attached to the housing 22 so as to cover the open front of the housing 22.

The optical unit 21 can be configured by removing from the optical unit 11 of the vehicle light 10 shown in FIG. 2 the heat sink 12*c*, the pinch sealing portion 14*a*, the open hole 15*a*, the air pressure adjusting bag 15*b*, and the regulation plate 15*c*. Specifically, the optical unit 21 can include the LED light source 12, the first reflector 13, the second reflector 14, the third reflector 15, the projection lens 16, the shutter 17, and the lens holder 18.

In the configuration of this exemplary embodiment, the space defined by the projection lens 16, the lens holder 18, and the reflectors 13, 14, and 15 is not necessarily sealed hermetically.

The housing 22 can be made of, for example, a thermoplastic resin and may be formed so as to surround the optical unit 21. The front thereof can be open.

The front-side lens 23 may be made of a transparent resin material, be fitted to the housing 22 so as to cover the front of the housing 22, and can be hermetically connected by welding, bonding or other method, resulting in a weld seal structure, a bonded seal structure, a fastener sealed structure etc.

Furthermore, a pinch sealing portion 22*a* may be provided in the housing 22, for evacuating the internal space of the housing 22 and/or for introducing an inert gas. It should be noted that the pinch sealing portion 22*a* may be provided in the upper surface of the housing 22, but the position thereof is not limited to the upper surface.

Moreover, an open hole 22*b* can be provided in the housing 22. An expandable air pressure adjusting bag 22*c* can be hermetically attached to the open hole 22*b*. The open hole 22*b* may be provided in, for example, the lower portion of the housing 22. The air pressure adjusting bag 22*c* can be configured similarly to the air pressure adjusting bag 15*b* in the embodiment of FIG. 2, and thus a detail description is omitted.

In a vehicle light 20 having the above-described configuration, when the optical unit 21 is energized from an exterior power source, the LED 12*a* of the LED light source 12 of the optical unit 21 is driven to emit light. The emitted light is reflected by the reflectors 13, 14, and 15 and is then emitted forward through the projection lens 16.

Then, the light emitted from the optical unit 21 is projected forward through the front-side lens 23.

As in the exemplary embodiment of FIG. 2, in this exemplary embodiment, the internal space of the housing 22 can be hermetically sealed, and an inert gas can be introduced into the internal space. Therefore, the internal space and the optical unit 21 do not substantially contain moisture vapor, and the intrusion of moisture vapor from exterior atmosphere into the internal space and the optical unit 21 can substantially be prevented.

Hence, the material constituting the LED 12*a* of the LED light source 12 of the optical unit 21 can be prevented from absorbing moisture vapor, and thus deterioration of the material can be prevented. In other words, the reduction in the luminous intensity of the LED 12*a* due to absorption of moisture can be prevented. Therefore, the reliability of the LED light source 12 and the vehicle light 20 is improved, and the life can be prolonged.

Furthermore, since an inert gas is introduced into the housing 22, the reflection surface of each of the reflectors 13, 14, and 15 can be prevented from being clouded by moisture vapor or the like during long-term use. In addition, the vapor deposited silver coating on the inner surface of each of the reflectors 13, 14, and 15 is prevented from being clouded due to oxidation or sulphidization. Since aging and deterioration can be suppressed to a minimum, a bright light distribution pattern can be obtained over a long period of time.

Even when the internal pressure of the housing 22 is increased or decreased due to the heat of the LED 12*a*, the air pressure adjusting bag 22*c* can expand or contract to maintain the internal pressure of the housing 22 approximately constant. Therefore, the deformation or fracture of the reflectors 13, 14, and 15 and the projection lens 16 due to thermal expansion can be prevented.

Furthermore, the heat generated by the LED 12*a* of the LED light source 12 of the optical unit 21 can be dissipated into the housing 22 to cause a convective flow in the housing 22. Thus, the convective flow circulates inside the housing 22 and the heat is dissipated accordingly.

Figure 4:
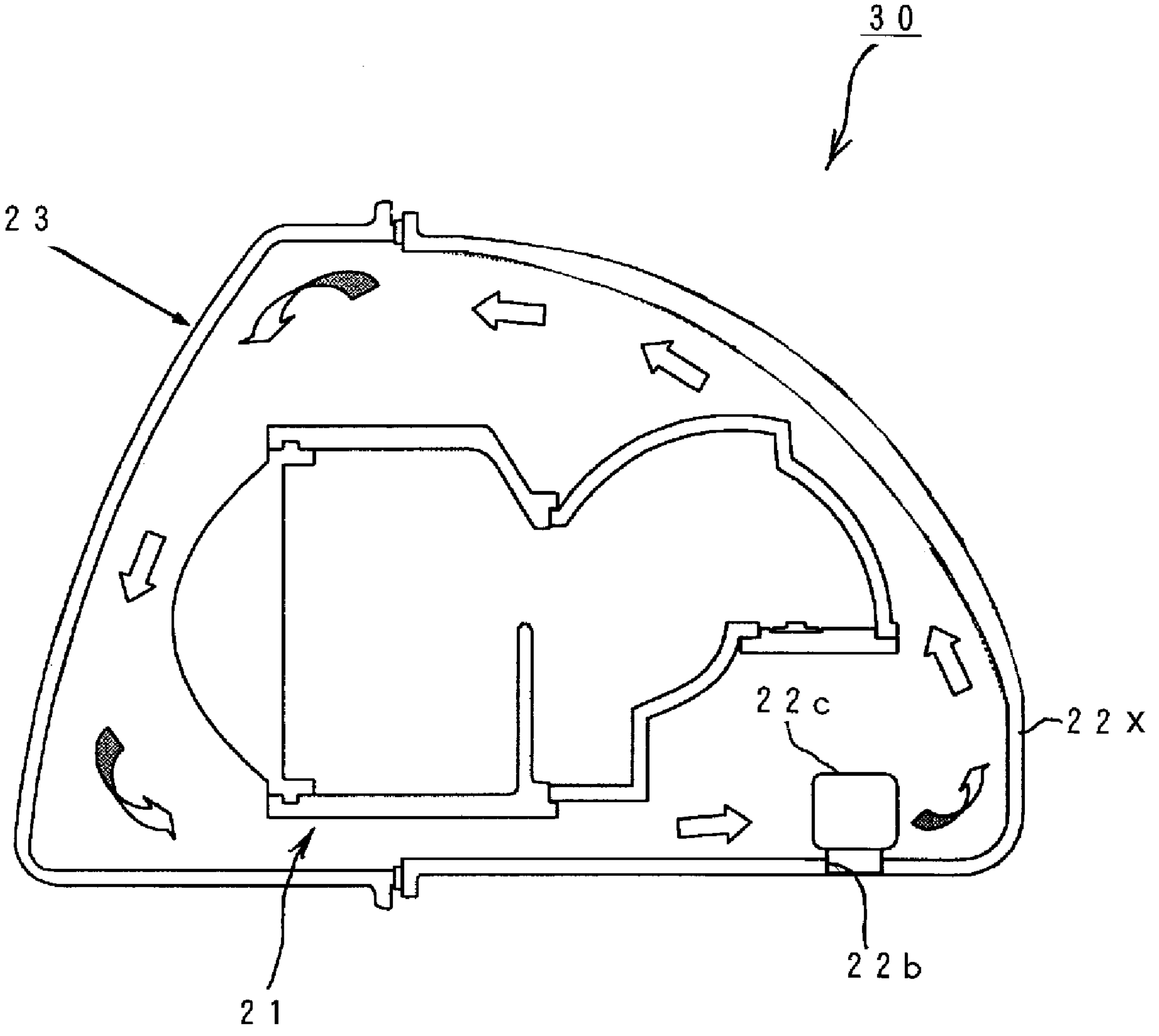
FIG. 4 is a schematic cross-sectional view illustrating of still another exemplary embodiment of a vehicle light made in accordance with principles of the disclosed subject matter.

FIG. 4 shows the configuration of still another exemplary embodiment of a vehicle light made in accordance with principles of the disclosed subject matter.

In FIG. 4, a vehicle light 30 can be configured approximately the same as that of the vehicle light 20 shown in FIG. 3. Thus, the same or similar components are denoted by the same numerals, and the description thereof is omitted.

The configuration of the vehicle light 30 of FIG. 4 is different from that of the vehicle light 20 shown in FIG. 3 at least in that housing 22*x* is shaped and configured differently as compared to housing 22 of FIG. 3. In the housing 22*x* of FIG. 4, the shape of the upper rear portion is different from that of the housing 22 in FIG. 3.

In the vehicle light 30, the housing 22*x* is formed such that the rear side extends upward and is bent forward, or is narrowed to round an upper rear corner, as particularly shown in FIG. 4. Housing 22*x* can have a convective flow generated in the internal space due to the heat generated by the energized LED 12*a* of the LED light source 12 of the optical unit 21. This convective flow goes up along the upper rear inner surface of the housing 22*x* and is guided toward the front-side lens 23. Thus, the front-side lens 23 is heated.

Then, the gas having heated the front-side lens 23 is cooled by heat dissipation, and flows downward and further flows below the LED light source 12. Thus, the gas circulates throughout the internal space of the housing 22*x*. Hence, the temperature distribution of the internal space of the housing 22*x* can be made substantially uniform. When a plurality of optical units are provided, the temperature conditions of the optical units can become approximately the same. Therefore, the luminous intensities of the optical units 21 can be uniform, and the variation of the luminous intensity between the optical units 21 can be suppressed. This effect is particularly noticeable when a plurality of optical units are provided since the luminous intensities of the optical units can be made uniform.

Furthermore, for example, when snow or the like adheres to the outer surface of the front-side lens 23, the snow is melted by the heated front-side lens. Therefore, the light projected forward from the optical unit 21 is not blocked by the snow adhering to the front-side lens 23 and is reliably projected forward with an appropriate luminous intensity.

In the exemplary embodiments described above, the optical units 11 and 21 are provided with the LED light source having an LED 12*a*. However, the present invention is not limited thereto. A light emitting device other than an LED, for example, a semiconductor light emitting device such as a semiconductor laser device, may be employed as a light source.

Furthermore, in each of the vehicle lights 20 and 30 of the illustrated exemplary embodiments described above, one optical unit 21 is provided in the housing 22. However, the present invention is not limited thereto. The vehicle light may be provided with a plurality of optical units 21.

Also, in each of the exemplary embodiments described above, the projection lens 16 is integrally molded with the lens holder 18 by insert molding. Again, the invention is not limited thereto. Separately molded parts may be hermetically connected by welding, bonding, or other methods. Alternatively, other and different combinations of structures can be integrally molded together.

In each of the exemplary embodiments described above, the lens holder 18 is hermetically connected to the reflectors 13, 14, and 15 by welding. The invention is not limited thereto. The lens holder 18 may be hermetically connected to the reflectors 13, 14, and 15 by bonding or other method, or the lens holder 18 may be integrally molded with the reflectors 13, 14, and 15.

Furthermore, in each of the exemplary embodiments described above, each of the optical units 11 and 21 is provided with the three reflectors 13, 14, and 15. However, the number of reflectors may be appropriately determined according to the specifications of the optical unit. In addition, the presence or absence of the shutter can be appropriately determined.

The vehicle light 10 as shown in the attached drawings is configured as an LED headlight for an automobile. However, the invention is not limited thereto. The invention is applicable to other types of vehicle lights such as a vehicle auxiliary light, a spot light, a traffic light, a signal light, a fog light, a driving light, a backup light, and the like.

While there has been described what are at present considered to be exemplary embodiments of the invention, it will be understood that various modifications may be made thereto, and it is intended that the appended claims cover such modifications as fall within the true spirit and scope of the invention.

What is claimed is:

1. A vehicle light configured as a projector-type optical unit and configured to emit light in a forward light emitting direction comprising:

a semiconductor light emitting device;

a reflector located adjacent the semiconductor light emitting device such that light emitted from the semiconductor light emitting device is reflected by the reflector in the forward light emitting direction;

a convex projection lens configured to project light that is at least one of light emitted directly from the light emitting device and light that is reflected by the reflector, in the forward light emitting direction, the lens including a rear side focus;

a shutter located adjacent the rear side focus of the projection lens, wherein a sealed space including at least an inner surface of the reflector that is located adjacent the semiconductor light emitting device is hermetically sealed from an exterior atmosphere;

a sealing member configured to hermetically seal the sealed space from the exterior atmosphere; and an air pressure adjusting bag made of a film-like material and located adjacent the sealed space in order to adjust air pressure in the sealed space.

2. The vehicle light according to claim 1, wherein the reflector is coated with vapor deposited silver.

3. The vehicle light according to claim 1, wherein the sealing member is configured as a lens holder which supports the projection lens, and wherein the projection lens is hermetically attached through the sealing member to the reflector so as to enclose the semiconductor light emitting device.

4. The vehicle light according to claim 3, wherein the reflector, the projection lens, and the sealing member are each made of a thermoplastic resin, and wherein the sealing member is hermetically connected to the reflector and the projection lens by at least one of a weld structure and a bond structure.

5. The vehicle light according to claim 3, wherein the reflector, the projection lens, and the sealing member are each made of a thermoplastic resin, the projection lens and the sealing member are hermetically and integrally molded, and the sealing member is hermetically connected to the reflector by at least one of a weld structure and a bond structure.

6. The vehicle light according to claim 3, wherein the reflector, the projection lens, and the sealing member are each made of a thermoplastic resin, the projection lens is molded hermetically in the sealing member, and the sealing member is hermetically connected to the reflector by at least one of a weld structure and a bond structure.

7. The vehicle light according to claim 1, wherein the sealing member includes, a housing which has an open front and surrounds the reflector, projection lens, and semiconductor light emitting device, and a front-side lens which is made of a transparent material and hermetically seals the open front of the housing.

8. The vehicle light according to claim 7, wherein the housing includes a pinch sealing portion.

9. The vehicle light according to claim 7, wherein the housing is formed such that a convective flow of air located in the sealed space inside the housing is guided toward the front-side lens, the convective flow of air being due to heat generated by the semiconductor light emitting device.

10. The vehicle light according to claim 9, wherein a rear portion of the housing is narrowed and an upper rear corner of the housing is rounded.

11. The vehicle light according to claim 2, wherein the sealing member is configured as a lens holder which supports the projection lens, and the projection lens is hermetically attached through the sealing member to the reflector so as to enclose the semiconductor light emitting device.

12. The vehicle light according to claim 2, wherein the sealing member includes, a housing which has an open front and surrounds the reflector, projection lens, and semiconductor light emitting device, and a front-side lens which is made of a transparent material and hermetically seals the open front of the housing.

13. The vehicle light according to claim 1, wherein the reflector surrounds the semiconductor light emitting device.

14. A vehicle light, configured as a projector-type optical unit and configured to emit light in a forward light emitting direction comprising:

a semiconductor light emitting device;

a reflector located adjacent the semiconductor light emitting device such that light emitted from the semiconductor light emitting device is reflected by the reflector in the forward light emitting direction;

a convex projection lens configured to project light that is at least one of light emitted directly from the light emitting device and light that is reflected by the reflector, in the forward light emitting direction, the lens including a rear side focus;

a shutter located adjacent the rear side focus of the projection lens, wherein a sealed space including at least an inner surface of the reflector that is located adjacent the semiconductor light emitting device is hermetically sealed from an exterior atmosphere;

a sealing member configured to hermetically seal the sealed space from the exterior atmosphere;

an air pressure adjusting bag made of a film-like material and located adjacent the sealed space in order to adjust air pressure in the sealed space; and an inert gas located in the sealed space.

15. The vehicle light according to claim 14, wherein the sealing member is configured as a lens holder which supports the projection lens, and wherein the projection lens is hermetically attached through the sealing member to the reflector so as to enclose the semiconductor light emitting device.

16. The vehicle light according to claim 14, wherein the sealing member includes, a housing which has an open front and surrounds the reflector, projection lens, and semiconductor light emitting device, and a front-side lens which is made of a transparent material and hermetically seals the open front of the housing.

17. A vehicle light configured to emit light in a forward light emitting direction comprising:

a semiconductor light emitting device;

a reflector located adjacent the semiconductor light emitting device such that light emitted from the semiconductor light emitting device is reflected by the reflector in the forward light emitting direction;

a projection lens configured to project light that is at least one of light emitted directly from the light emitting device and light that is reflected by the reflector, in the forward light emitting direction, wherein a sealed space including at least an inner surface of the reflector that is located adjacent the semiconductor light emitting device is hermetically sealed from an exterior atmosphere; and an air pressure adjusting bag made of a film-like material located adjacent the sealed space in order to adjust air pressure in the sealed space.

18. The vehicle light according to claim 17, further comprising:

a sealing member configured to hermetically seal the sealed space from the exterior atmosphere, wherein the sealing member is configured as a lens holder which supports the projection lens, and the projection lens is hermetically attached through the sealing member to the reflector so as to enclose the semiconductor light emitting device.

19. The vehicle light according to claim 17, further comprising:

a sealing member configured to hermetically seal the sealed space from the exterior atmosphere, wherein the sealing member includes, a housing which has an open front and surrounds the reflector, projection lens, and semiconductor light emitting device, and a front-side lens which is made of a transparent material and hermetically seals the open front of the housing.

* * * * *